United States Patent
Himmel et al.

(10) Patent No.: US 6,480,852 B1
(45) Date of Patent: Nov. 12, 2002

(54) METHOD AND SYSTEM FOR RATING BOOKMARKS IN A WEB BROWSER

(75) Inventors: Maria Azua Himmel, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,090

(22) Filed: Dec. 11, 1998

(51) Int. Cl.⁷ .............................................. G06F 17/30
(52) U.S. Cl. ................. 707/10; 707/4; 707/9; 709/223; 709/245
(58) Field of Search ............... 707/4, 10, 501, 707/513, 503, 9; 709/223, 245

(56) References Cited

U.S. PATENT DOCUMENTS

| | | | |
|---|---|---|---|
| 5,678,041 A | * 10/1997 | Baker et al. | 707/9 |
| 5,706,507 A | 1/1998 | Schloss | 395/615 |
| 5,757,417 A | 5/1998 | Aras et al. | 348/10 |
| 5,848,410 A | * 12/1998 | Walls et al. | 707/4 |
| 5,918,237 A | * 6/1999 | Montalbano | 707/513 |
| 5,963,964 A | * 10/1999 | Nielsen | 707/501 |
| 6,032,162 A | * 2/2000 | Burke | 707/501 |
| 6,032,182 A | * 2/2000 | Mullen-Schultz | 709/223 |
| 6,041,360 A | * 3/2000 | Himmel et al. | 709/245 |
| 6,163,778 A | * 12/2000 | Fogg et al. | 707/10 |
| 6,256,649 B1 | * 7/2001 | Mackinlay et al. | 707/503 |

OTHER PUBLICATIONS

Rose Aguilar, *Explorer helps police Net*, http://ne2.news.com/News/Item/0,4,2136,00.html, pp. 1–4.

Kristina B. Sullivan, *PICS: Rating the Net without Uncle Sam*, http://www5.zdnet.com/zdnn/content/pcwk/1350/pcwk0056.html, pp. 1–4.

* cited by examiner

*Primary Examiner*—Charles L. Rones
*Assistant Examiner*—Thuy Pardo
(74) *Attorney, Agent, or Firm*—Duke W. Yee; Jeffrey S. LaBaw; Stephen J. Walder, Jr.

(57) ABSTRACT

A bookmark display method executable in a computer system having a processor, a display and a browser. The display method begins by associating a rating with a given bookmark entry (e.g., a bookmark or bookmark set) and then storing the bookmark entry with the rating. Upon a subsequent request to display the browser's bookmarks, the given bookmark entry is displayed with a user-selectable visual cue. Moreover, access to the given bookmark entry may be selectively inhibited if the bookmark rating has a given property. Bookmark rating values defined at a server also may be selectively displayed, modified and managed.

26 Claims, 3 Drawing Sheets

METHOD AND SYSTEM FOR RATING BOOKMARKS IN A WEB BROWSER

BACKGROUND OF THE INVENTION

1. Technical Field

This invention relates generally to information retrieval in a computer network. More particularly, the invention relates to a method to specify and display a rating property to a bookmark or bookmark set in a browser used to retrieve Web pages in an Internet environment. The rating property may be specified by the author of a Web page, or a user may assign a custom rating.

2. Description of the Related Art

It is well known to couple a plurality of computer systems into a network of computer systems. In this way, the collective resources available within the network may be shared among users, thus allowing each connected user to enjoy resources that would not be feasible economically to provide to each user individually. With the growth of the Internet, sharing of computer resources has been brought to a much wider audience. The Internet has become a cultural medium in today's society for both information and entertainment. Government agencies employ Internet sites for a variety of informational purposes. For many companies, one or more Internet sites are an integral part of their business; these sites are frequently mentioned in the companies' television, radio and print advertising.

The World Wide Web, or simply "the Web", is the Internet's multimedia information retrieval system. It is the most commonly used method of transferring data in the Internet environment. Client machines accomplish transactions to Web servers using the Hypertext Transfer Protocol (HTTP), which is a known application protocol providing users access to files, e.g., text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator or Microsoft Internet Explorer, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML. Web browsers have become the primary interface for access to many network and server services.

The entry of the URL in the entry field of a browser can be a difficult task for many users. While the URL for the main Web page of a major company can be relatively brief, e.g., www.ibm.com, subsidiary pages can have very lengthy URLs in, at least to the average user, an arcane syntax. Recognizing the difficulties involved, the browser developers have provided one useful means of returning to a favorite URL, namely, by the creation of user stored "bookmarks" and bookmark sets in the browser.

Once created, bookmarks and bookmark sets offer a means of page retrieval. The user can cause the browser to display his or her bookmark list and thereby select to go directly to a favorite page. Thus, the user avoids having to enter a lengthy URL or to retrace the original tortuous route through the Internet by which he or she may have arrived at the Web site. Once a bookmark is added to a bookmark list or bookmark set, in general, the bookmark becomes a permanent part of the browser until removed. The permanence and accessibility of bookmarks have made them a valuable means for personalizing a user's Internet access through the browser.

The current browser support level of bookmarks has many flaws. Several of these problems are described and addressed by a novel bookmark management scheme as set forth in copending application Ser. No. 09/080,022 now U.S. Pat. No. 6,212,522 titled "Method For Serving Bookmark Sets", which application is assigned to the assignee of this application and incorporated herein by reference. That application teaches, among other things, a mechanism for managing browser bookmarks, for searching bookmark sets, for customizing a served bookmark set, and for enabling a user to subscribe to receive updates to a selected bookmark set.

Another problem with existing technology is that Web browsers to do not provide any means by which individual bookmarks or bookmark set entries can be rated. Moreover, existing browsers do not provide or indicate any rating value of the URL associated with the bookmark on the HTTP request. Thus, a given user (e.g., a child) may easily access content (namely, a bookmarked page) that was bookmarked by another (i.e. a parent). Current Web browser rating authority technology only allows ratings to be applied realtime upon selection of a link on a page. Such techniques are not capable of rating bookmark entries or filtering bookmark selections.

It would be desirable to provide a means by which bookmark entries could be rated. This is a problem addressed by the various embodiments of the present invention.

BRIEF SUMMARY OF THE INVENTION

It is an object of this invention to provide a browser mechanism that identifies and displays a server-supplied bookmark set rating.

It is an object of the present invention to enable a Web browser user to assign a rating value as a property of a given bookmark or bookmark set.

It is another object of the present invention to display bookmarks or bookmark sets with rating values and to selectively control access to Web pages using those rating values.

It is a further object of the invention to associate a rating property value with a given bookmark or bookmark set entry and to display that rating property value to a user with a visual cue. The visual cue may be a color, an icon, an image (e.g., a gif, jpeg or .png file type) a display attribute property (e.g., hashed, blurred, reversed video, etc.) or the like.

It is still another object of the present invention to selectively inhibit access to or display of any Web page that is associated with a bookmark having a rating property value that is less than some user- or system-defined threshold.

It is a further object of this invention to provide a GUI bookmark management interface that enables a user to associate a default or customized rating with a given bookmark (i.e. a URL) or a bookmark set. A given rating may be customized with a particular visual attribute defined by the user.

In one particular embodiment, the Web browser includes a display panel that enables the user to define new ratings and to associate given display criteria (e.g., color, font, size, an icon, an image, etc.) to be associated therewith.

It is a further object of this invention to assign different bookmark ratings to a set of bookmarks and to display each rating type in a different manner. Thus, for example, a business-related bookmark may be displayed with a dollar sign icon, a technology-related bookmark may be displayed with a computer icon, a family entertainment bookmark may be displayed with a family icon, and the like.

Another object of this invention is to enable a Web browser user or administrator (e.g., a parent in a household) to specify and create a rating value as a property of a bookmark entry. In a preferred embodiment, the URL associated with the bookmark entry cannot be selected if the rating authority has a given access restriction. Moreover, the user preferably is provided visual feedback that the bookmark is not selectable or that a password is required to access the bookmark.

Yet another object of this invention is to enable a Web server content provider to specify and create a rating value with respect to a given content link. When a page including this link is then served to a Web client and set as a bookmark, the server-supplied rating value is stored in the browser and may be used to selectively inhibit browser access to the content. The Web browser user may override or supplement this setting using local bookmark rating resources.

Yet another object of this invention is to enable downloading to a browser of a set of URLs that include rating values. The sets of URLs can be downloaded as an integral unit, namely a bookmark set.

These and other objects of the invention are provided by a method for using bookmark rating values, comprising a number of process steps. The method begins by assigning a rating as a property of a given bookmark entry. The bookmark entry may be an individual bookmark or bookmark set. When the user stores the bookmark entry into the browser's set of bookmarks, the respective rating value for the URL is stored therewith. When the user then displays the bookmarks stored in the browser, the rating attribute of the bookmark entry is visually reflected using a visual cue. Moreover, if the browser rating authority is less than the value assigned to the bookmark entry, the entry is not selectable.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

These objects, features and advantages will be more readily understood with reference to the attached figures and following description.

DETAILED DESCRIPTION OF TEE PREFERRED EMBODIMENT

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000™ line of computers which run on the AIX™ operating system.

Figure 1:
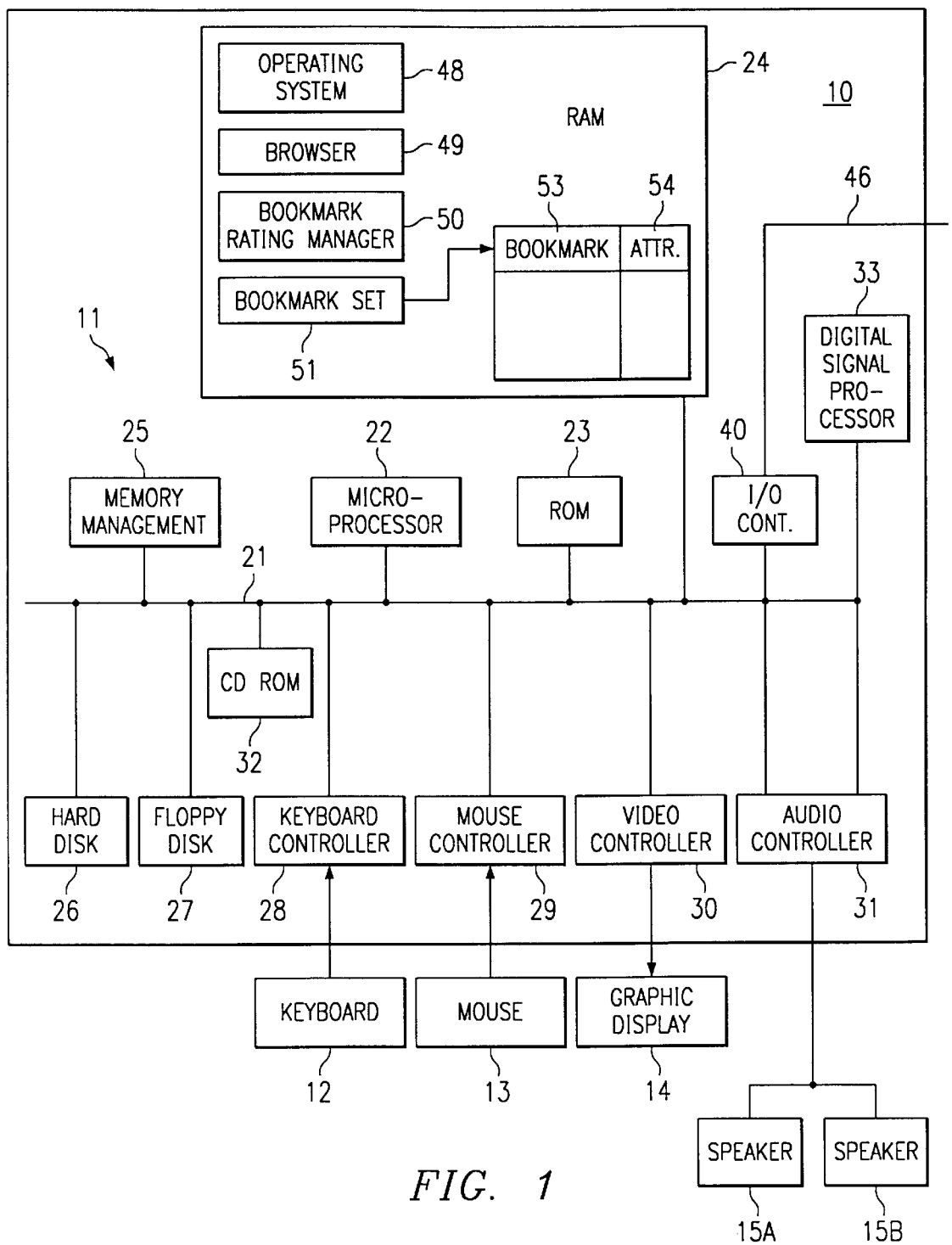
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions resident in the random access memory 24 of one or more computer 30 systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

A Web browser is a program that allows viewing the content of the Internet. A well known Web browser is Netscape Navigator, however, many browsers exist. Some are general purpose and have many capabilities to provide a variety of functions. Other are less capable and special purpose. In general, a Web browser is a program that is capable of parsing and presenting a document written in HTML, although those skilled in the art would appreciate that other markup languages such as dynamic HTML and XML will be used in the browsers of the future.

As is well known, commercial browser products have the capability of managing bookmarks (sometimes referred to as "favorites"), with each bookmark entry comprised of a URL to a web page and an associated descriptive text string which describes the web page in such a way to be easily recognized by the user. The descriptive text can be entered by the user when creating the bookmark set. The typical browser default, when the user does not enter any descriptive text, is to use the text within an embedded "title" tag which is often sent as part of the HTML header. Other information such as pointers to cached copies of the web page can be included in the bookmark entry.

Moreover, the idea of creating "bookmark sets" has been proposed in copending, commonly assigned application, Ser. No. 08/977,634, now U.S. Pat. No. 6,208,995, entitled "Web Browser Download of Bookmark Set", filed Nov. 11, 1997, which is hereby incorporated by reference. In that referenced application, a bookmark set is associated with a web server and/or web page and downloaded to a client browser by either a push or pull operation. A bookmark set is comprised of referents, typically URLs, to various locations in the Internet as well as text descriptions of the locations. In addition, a bookmark management scheme has been proposed in copending, commonly assigned application, Ser. No. 09/080,022, now U.S. Pat. No. 6,212,522, entitled "Method For Serving Bookmark Sets", filed Nov. 11, 1997, which is incorporated herein by reference. The latter application teaches, among other things, a mechanism for managing browser bookmarks, for searching bookmark sets, for customizing a served bookmark set, and for enabling a user to subscribe to receive updates to a selected bookmark set.

In accordance with the present invention, and with reference to FIG. 1, the browser 49 is equipped with a bookmark rating manager 50, a software module that handles bookmarks and bookmark set ratings according to the teachings of the present invention. The bookmark rating manager is preferably part of the browser itself, but could be installed in the browser as a plug-in or Java applet.

According to the present invention as illustrated in FIG. 1, a given bookmark set 51 may include one or more bookmarks 53, each of which includes a rating attribute 54. The bookmark rating manager 50 provides the means by a server-supplied rating value associated with a bookmark or bookmark set is stored, displayed and otherwise managed at the browser. The bookmark rating manager 50 also provides the means by which a user may specify, store and/or display a rating value as a property of a given bookmark entry or bookmark set. In the case of a bookmark set, the rating value assignment (at either the server or the client) may be accomplished for the entire set in a single operation. Thus, the present invention contemplates storage of bookmarks with server-supplied or user-defined ratings.

In particular, Web page designers presently have the ability to include HTML metatags in the header of an HTML document served on the Web. One known attribute of an HTML metatag is a content rating for the particular Web page. Thus, according to the present invention, the bookmark display manager 50 is programmed to identify this server-supplied rating and to associate that rating with the bookmark, e.g., during a bookmark save operation. The bookmark display manager 50 also includes means for displaying a bookmark or bookmark set, together with the server-supplied rating value. A visual cue may optionally be associated with the rating value, and different rating types may be displayed with different visual cues.

Also, the bookmark display manager 50 may be used to selectively override a browser preference for viewing only certain rating types for selected URLs. Alternatively, the bookmark rating manager 50 enables a user to modify or override server-supplied rating values. Thus, according to the invention, the user may toggle back and forth to display a given bookmark or bookmark set (or other list) with either server-supplied or user-defined ratings.

Figure 2:
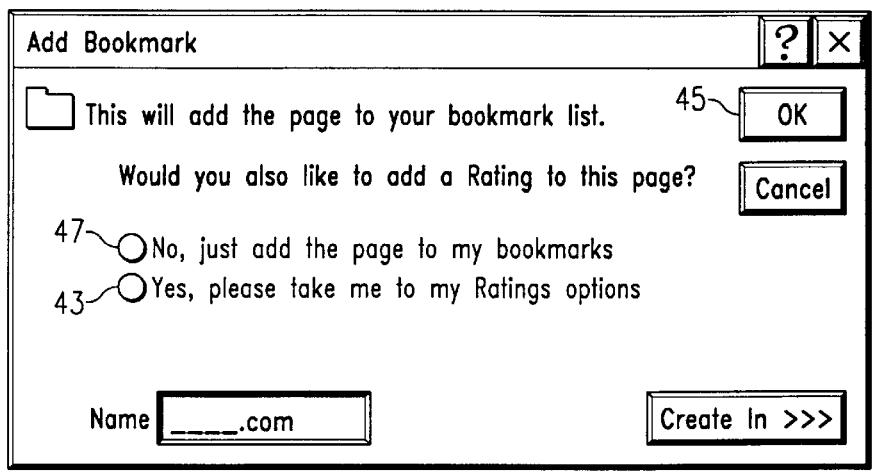
FIG. 2 depicts a graphical user interface (GUI) dialog by which a user may be directed to a Ratings dialog.

As noted above, the bookmark rating manager 50 also enables the user to specify a rating value during the bookmark operation itself. As is well-known, when the user decides to save a URL as a bookmark, he or she selects a bookmark option in the browser. This process activates a dialog panel that is used to specify a common name for the bookmark and to save the bookmark to a user-defined folder. During this operation, and according to the present invention, a user also may be provided the opportunity to associate a rating with the bookmark (or perhaps to modify a server-supplied rating). Thus, for example, once the bookmark is selected in a known manner, the Add Bookmark display panel 41 as shown in FIG. 2 is displayed. The particular configuration of this panel 41 is merely exemplary. Through this panel, the bookmark rating manager 50 queries whether the user desires to add a rating to the page being bookmarked. If so, the user selects the Yes radio button option 43 and selects the OK button 45. This action activates the bookmark rating manager 50 to offer the display panels shown in FIGS. 3–4, which panels enable the user to select or customize a rating value. If the user does not desire to add a rating, he or she selects the No radio button option 47 but may still save the URL as a bookmark by entering a common name in the Name field and selecting the OK button 45.

Figure 3:
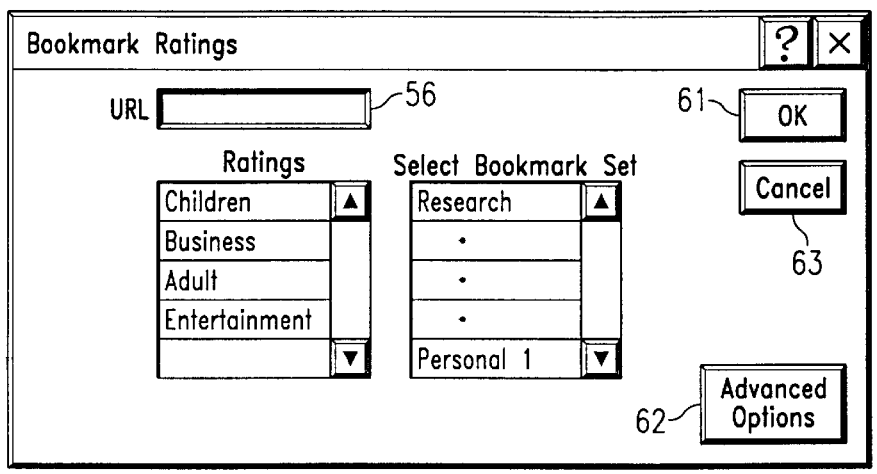
FIG. 3 depicts a default GUI Ratings dialog panel.

In particular, FIG. 3 illustrates one preferred default dialog 55 created by the bookmark rating manager 50.

Figure 4:
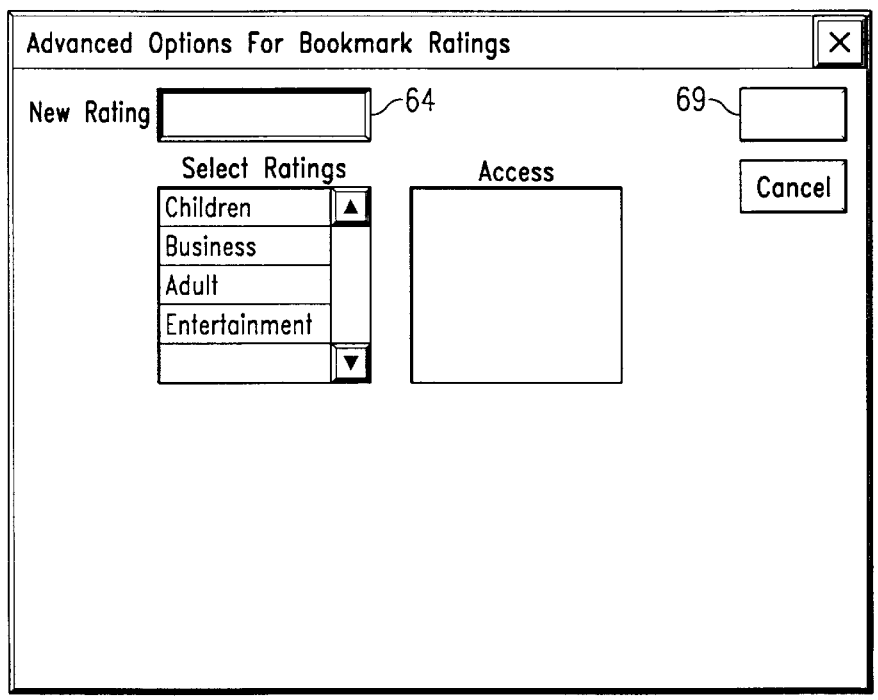
FIG. 4 depicts an Advanced Options GUI dialog panel by which a user may create a custom bookmark rating according to the present invention.

Default dialog 55 may be reached directly when the user decides to bookmark a URL (i.e. without passing first through the Add Bookmark panel 41). This screen preferably includes a URL field 56, a Select Bookmark Set listbox 58, a Rating listbox 60, an OK button 61, an Advanced Options button 62 and a Cancel button 63. Activation of the Advanced Options button 62 causes the display of the Advanced Options dialog panel 57 shown in FIG. 4. This latter panel include a New Rating field 64, a Select Rating listbox 66 (which corresponds to the Rating listbox 60 is the default panel of FIG. 3), an Access control box 67, and a plurality of individual rating attribute controls 68. These latter controls include, for example, a Color listbox 70, a Font listbox 72, a Size listbox 74, an Icon listbox 76, a Display Options listbox 75, and an Image box 78. The Image box 78 includes a Search button 80 which, upon activation, brings up an appropriate search dialog (e.g., a file manager). Each of the listboxes includes appropriate up-down controls to enable the user to scroll through various selections included therein. The user selects a given value in any known manner (e.g., clicking a mouse or depressing a key). Although listboxes are shown in FIGS. 3–4, one of ordinary skill will appreciate that any other suitable graphic controls (e.g., radio buttons, drop down lists, etc.) may be used. Indeed, the particular GUI control mechanism do not form part of the present invention.

As will be described below, the Access control box 67 includes, for example, a pair of radio buttons (labeled, for example, Unrestricted and Restricted). When the user selects a rating in the Select Rating listbox 66, he or she may then associate an access restriction to that rating. Selection of the access restriction limits the browser use of the bookmark to users having a given authority. Thus, for example, if the browser is used at a personal computer located in a home where both adults and children use the browser, the adult user may rate a given bookmark (using the Ratings listbox 66) and then restrict access to his or her children by associating an access rating to the bookmark. To provide a further concrete example, assume the rating type selected is Children. In this case, presumably the user would associate the rating as "Unrestricted". On the other hand, if an adult rating were selected for a given bookmark, the user may select "Restricted" to ensure that the bookmark is not readily accessed absent entry of a suitable password or the like. In this manner, the bookmark rating manager 50 selectively inhibits access to a given bookmark entry if the rating is associated with some access restriction.

While the access restriction shown in FIG. 4 is merely a two level restriction (namely, on or off), one or ordinary skill will appreciate that different threshold levels may be provided. If a custom access restriction is required, the user may select the Custom radio button in Access box 67 and call up a customization function (not shown). Thus, different rating levels may be associated with different types of bookmark values.

The bookmark rating manager 50 preferably generates the rating dialog panel 55 during the user's "saving" of a particular URL as a bookmark as previously noted. Thus, according to this invention, during the bookmark save operation, the user is afforded an opportunity to associate a given rating value to the URL to be saved. Of course, this rating function may also be used to update a previously-created bookmark. Thus, in a typical operation, the rating dialog 55 is displayed with the URL (currently being saved) displayed in the URL field 56. Alternatively, the user may type in a URL and perform the following rating operations. After the URL is supplied or entered in URL field 56, the user may associate a rating to the URL by highlighting one of the ratings set forth in the Ratings listbox 60. This listbox 60 preferably is populated with a set of ratings. A default set of ratings as illustrated includes, for example, Children, Business, Adult, Entertainment and the like, and these ratings may be supplied with the bookmark rating manager 50. If the user desires to supplement this list, he or she selects the Advanced Options button 62 to bring up the Advanced Options display panel of FIG. 4. A New Rating (e.g., Financial) is then entered into field 64. The user then selects some rating attribute associated with this rating by highlighting one or more controls (e.g., color, font, size, display attribute icon, or image) using the controls 68. Once the user has completed the New Rating definition, he or she selects the OK button 69. The New Rating is then entered into the Select Rating listbox 66, and in the Rating Listbox 60 once the display panel 55 is displayed (or the Advanced Options panel is closed).

The controls 68 also may be used to modify the visual appearance of one of the default ratings provided by the bookmark rating manager 50. According to the present invention, the bookmark thus may have associated therewith a visual feature defined by one or more of the controls 68. This characteristic serves as a visual cue or "alert" to identify some given characteristic of the bookmark. It is preferably customized by the user.

Thus, the bookmark rating manager 50 enables a user to associate a given URL (namely, a bookmark entry) with a rating, which may be either a default rating or a user-specified rating. The given bookmark rating remains associated with the bookmark and is preferably displayed therewith. Moreover, the bookmark rating manager 50 provides a mechanism by which the bookmarks (and/or bookmark sets) and their associated ratings may be readily identified by convenient, preferably user-selectable visual cues. The resulting interface is easy-to-use and provides significant advantages over the simple text-based bookmark display methods.

As illustrated in FIG. 3, the bookmark rating manager panel 55 also includes the bookmark set listbox 58 that includes one or more bookmark sets. Listbox 58 may be used to associate a given URL (entered in the field 56) with a given bookmark set. As noted above, the present invention further contemplates associating ratings with given bookmark sets. This is accomplished by having the user open dialog panel 55 and select both a rating (from listbox 60) and a bookmark set (from listbox 58).

Thus, according to the present invention, when the user bookmarks a URL, he or she may also assign a default or custom rating to the URL or URL set. Further, using the Advanced Options display panel controls, the particular rating is customized with a visual cue. To provide a concrete example, assume the user desires to bookmark the Web site, www.ibm.com. Once the user selects the bookmark function, the bookmark rating manager displays panel 55. In this example, the www.ibm.com URL is then entered in field 56. (It is assumed that the user selected the name IBM for this bookmark in the Add Bookmark dialog). As noted above, the user may associate the URL with a given bookmark set by selecting one of the sets in the bookmark set listbox 58. If the desired rating is not present in the Rating listbox 60, the user selects the Advanced Options button to bring up the Advanced Options panel 57 as previously described. The user may then enter a new Rating category, e.g., Technology, and assign to that category (or to the bookmark itself) whatever display characteristics are desired.

Thus, it should be appreciated that the controls 68 may be used to provide a visual cue with respect to the bookmark (or bookmark set) text itself, or to add some visual cue to this text, or both. In this representative example, assume that the user selects the italics option from the Display Options listbox 75. If he or she also desires to provide an icon association, the appropriate icon (e.g., a representation of a diskette) is selected from the Icon listbox 76. These characteristics are then selected by the OK button. In such case, when the bookmark is subsequently displayed, the text of the bookmark will be displayed italicized and displayed with an appropriate icon:

[icon] IBM

Thus, the bookmark and its associated user-selected rating are readily ascertained upon visual inspection.

Figure 5:
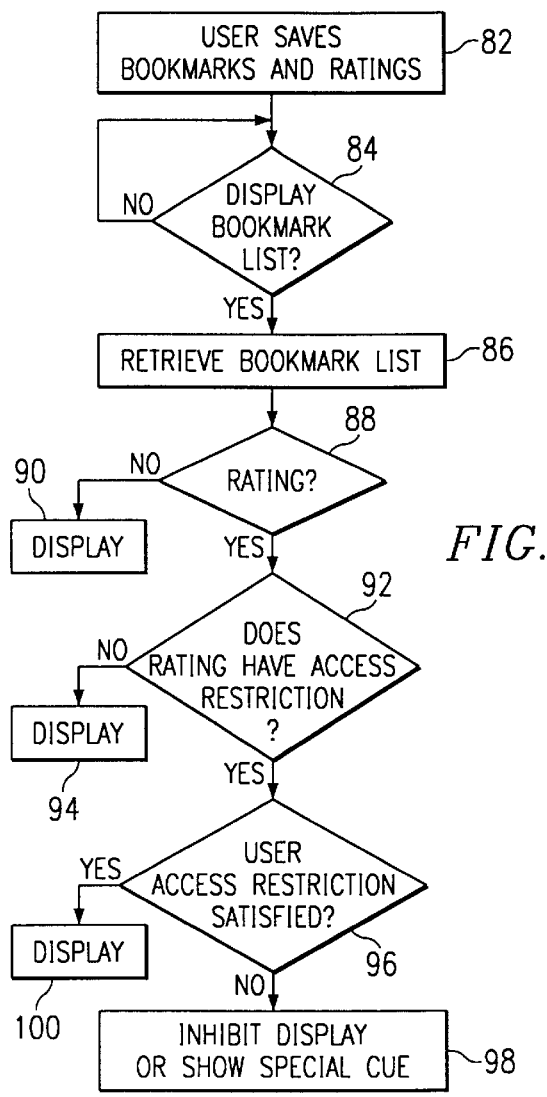
FIG. 5 is a flowchart illustrating a preferred bookmark rating display routine of the present invention.

As noted above, the bookmark rating manager 50 also provides a mechanism for enabling a user to define an access restriction for a given bookmark. In such case, the bookmark rating manager selectively inhibits use of the bookmark entry unless the then-current user has a given authority. FIG. 5 illustrates a preferred routine for providing this functionality. The routine begins at step 82 with the user saving one or more bookmarks and their associated ratings in the manner previously described and illustrated. The routine then continues at step 84 to repeatedly test whether a display bookmark list call has been made. If the outcome of the test at step 84 indicates that the user has requested a display of the bookmarks stored in the browser, the routine continues at step 86 to retrieve the bookmark list. At step 88, a test is performed for each bookmark entry to determine if the entry has a rating associated therewith. If the outcome of the test at step 88 is negative, the routine branches to step 90 to display the bookmark in a conventional manner. If, however, the outcome of the test at step 88 is positive, the routine continues at step 92 to test whether the rating has an access restriction. If the outcome of the test at step 92 is negative, the routine branches to step 94 to display the bookmark, together with the visual cue defined by the controls 68. If, however, the outcome of the test at step 92 is positive, the routine continues at step 96 to test whether a user access restriction (e.g., entry of a given password when the user initiates the browsing session) has been satisfied. If the user access restriction is not satisfied, the routine branches to step 98, wherein the URL is not displayed or is displayed in a given manner that makes it readily apparent to the user that the bookmark is presently inaccessible. If the outcome of the test at step is positive, preferably the bookmark is displayed. This is step 100.

Figure 6:
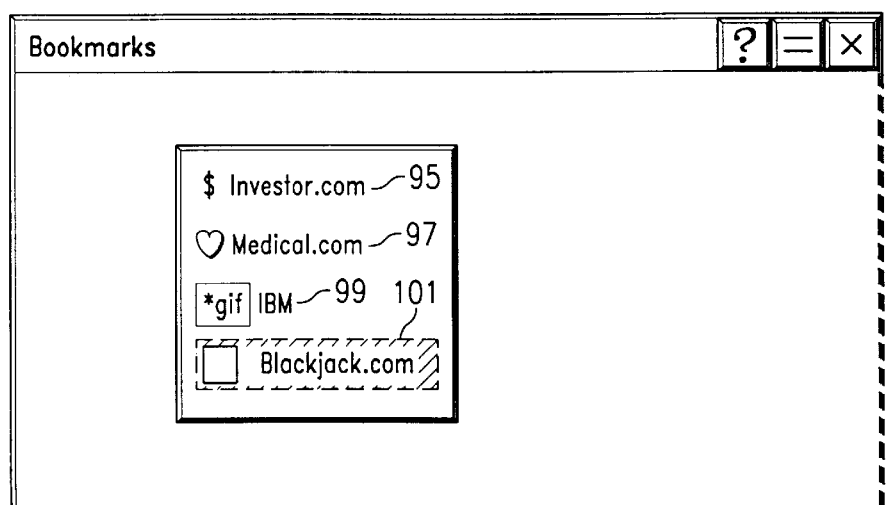
FIG. 6 is a representative display of bookmarks with visual cues according to the present invention.

Thus, as illustrated in FIG. 6, bookmarks 95, 97 and 99 are unrestricted while bookmark 101 is restricted. This status is apparent from the visual cue, which illustrates the restricted bookmark "grayed out". Of course, any particular visual cue that illustrates the bookmark as restricted may be used.

As noted earlier, the bookmark display manager 50 also processes ratings provided with served Web content. Thus, for example, step 92 of the above-described routine thus may also test to determine whether a given access restriction is defined by a server-supplied rating. Thus, in an appropriate case, the server-supplied rating may be used to selectively inhibit a user's ability to access the page associated with the saved bookmark.

Moreover, the bookmark display manager 50 may receive a set of URLs and determine if the set has a rating value associated therewith. If so, the rating value may be selectively displayed together with its rating value or values. As note above, a visual cue may optionally be associated with the rating value, and different rating types may be displayed with different visual cues.

Using interface controls, such as dialog panels of the type described above, a user may selectively override, modify or rename a given server-supplied rating value. Thus, for example, if a given rating is "PG", the user may selectively modify that rating to "R". Likewise, a server-supplied "R" rating may be renamed as "Adult" by having the user select that rating, and then having the user navigate to the Advanced Options panel 57 and select the appropriate options. By navigating to the Advanced Options panel, the user may also modify other display attributes such as color, font, size, display options and the like. As also noted above, the user may toggle back and forth to display a given bookmark or bookmark set (or other list) with either server-supplied or user-defined ratings.

If desired, the user may use a pull-down menu or other suitable control to identify a given server-supplied or user-defined rating value and to display all bookmarks or bookmark sets that have that value.

The present invention thus provides many advantages over known bookmark techniques. One of the important features of this invention is that the bookmark rating manager allows the user to assign a rating attribute to a newly-identified bookmark or a newly served bookmark set. Thus, the user can create personalized ratings as bookmarks are created, updated or otherwise managed. In particular, a user may customize new rating types and/or create unique visual cues for given bookmark ratings. Both user-supplied and server-supplied ratings may be used to selectively inhibit use of saved bookmarks except to users having a given authority (e.g., entry of a password).

One of ordinary skill in the art will appreciate that the rating value functionality of the present invention is not limited to bookmarks. Rather, the inventive rating value techniques disclosed herein are useful with any URL list, or any other list compiled by the user.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would, recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A bookmark display method executable in a computer system having a processor, a display and a browser, comprising steps executable in the processor for:

associating a rating with a given bookmark entry;

storing the given bookmark entry with the rating;

subsequently displaying the given bookmark entry with a visual cue, wherein the visual cue provides information about the rating; and selectively inhibiting access to the given bookmark entry if the rating has a given property.

2. The bookmark display method as described in claim 1 wherein the visual cue includes displaying the given bookmark entry in a user-selectable color.

3. The bookmark display method as described in claim 1 wherein the visual cue includes displaying the given bookmark entry in a user-selectable font.

4. The bookmark display method as described in claim 1 wherein the visual cue includes displaying the given bookmark entry together with a user-selectable graphic.

5. The bookmark display method as described in claim 1 wherein the visual cue includes displaying the given bookmark entry together with a user-selectable image.

6. The bookmark display method as described in claim 1 wherein the visual cue indicates that the given bookmark entry is not selectable.

7. The bookmark display method as described in claim 6 wherein the rating is customized by a user.

8. The bookmark display method as described in claim 1 wherein the given bookmark entry is a bookmark set.

9. The bookmark display method as described in claim 1 wherein the rating is defined by a provider of a page identified by the given bookmark entry.

10. A computer program product in a computer readable medium for specifying and displaying a bookmark together with a bookmark rating property, comprising:
    means for associating a rating with a given bookmark entry;
    means for storing the given bookmark entry with the rating;
    means for displaying the given bookmark entry with a visual cue, wherein the visual cue provides information about the rating; and
    means for selectively inhibiting access to the given bookmark entry if the rating has a given property.

11. A method operative in a Web browser for inhibiting access to a Web page defined by a bookmark; comprising the steps of:
    associating a rating with the bookmark;
    storing the bookmark with the rating;
    outputting the bookmark with a visual cue, wherein the visual cue provides information about the rating;
    upon a subsequent request to access the Web page defined by the bookmark, determining whether the rating has a given property indicating that access to the Web page is to be restricted; and
    inhibiting access to the Web page if the rating has the given property.

12. The method as described in claim 11 wherein the rating property is user-selectable.

13. The method as described in claim 12 wherein the rating property is set via a browser display panel option.

14. The method as described in claim 12 wherein the rating property is set by a provider of the Web page identified by the bookmark.

15. The method as described in claim 11 wherein the visual cue includes displaying the bookmark in a color.

16. The method as described in claim 11 wherein the visual cue includes displaying the bookmark with an icon.

17. A bookmark display method executable in a computer system having a processor, a display and a browser, comprising steps executable in the processor for:
    associating a rating with a given bookmark entry;
    storing the given bookmark entry with the rating; and
    subsequently displaying the given bookmark entry with a visual cue, wherein the visual cue provides information about the rating.

18. The bookmark display method as described in claim 17 wherein the visual cue includes displaying the given bookmark entry in a color.

19. The bookmark display method as described in claim 17 wherein the visual cue includes displaying the given bookmark entry a given display format.

20. The bookmark display method as described in claim 17 wherein the given bookmark entry is a bookmark.

21. The bookmark display method as described in claim 17 wherein the given bookmark entry is a bookmark set.

22. A method for serving bookmarks to a client browser, comprising the steps of:
    storing a plurality of bookmark sets at a server coupled to a network, each bookmark set containing a set of Uniform Resource Locators (URLs) and at least one rating value and being downloadable as a unit;
    responsive to query from a client, serving to the client a bookmark set;
    receiving and storing the bookmark set at the client; and
    displaying the bookmark set with the rating value of at least one bookmark illustrated by a visual cue, wherein the visual cue provides information about the rating.

23. A method for serving a set of URLs to a client browser, comprising the steps of:
    associating a rating value with the set of URLs;
    responsive to a query from a client, serving to the client the set of URLs and the associated rating value;
    receiving and storing the set of URLs and the associated rating value,
    displaying the set of URLs, together with the rating illustrated by a visual cue.

24. The method as described in claim 23 further including the steps of:
    modifying the rating value; and
    displaying the set of URLs, together with the modified rating value illustrated by a visual cue.

25. The method as described in claim 23 further including the steps of:
    renaming the rating value; and
    displaying the set of URLs, together with the renamed rating value illustrated by a visual cue, wherein the visual cue provides information about the renamed rating.

26. The method as described in claim 25 further including the step of toggling between the renamed rating value and the rating value.

* * * * *